United States Patent [19]
Salicini

[11] 4,379,504
[45] Apr. 12, 1983

[54] ARTICLE FEEDING DEVICE
[75] Inventor: Sandro Salicini, Bologna, Italy
[73] Assignee: Carle & Montanari S.p.A., Bologna, Italy
[21] Appl. No.: 216,711
[22] Filed: Dec. 15, 1980
[30] Foreign Application Priority Data
Dec. 21, 1979 [IT] Italy .............................. 15339/79[U]
[51] Int. Cl.³ .......................................... B65G 47/12
[52] U.S. Cl. .................................... 198/455; 198/397; 221/168
[58] Field of Search ............... 198/455, 443, 534, 397, 198/392, 443, 454, 455; 221/265, 168; 133/5 R

[56] References Cited
U.S. PATENT DOCUMENTS

| 2,389,496 | 11/1945 | Gagnon | 198/455 |
| 2,777,561 | 1/1957 | Rose | 198/393 |
| 3,276,564 | 10/1966 | Seragnoli | 198/445 |
| 3,490,574 | 1/1970 | Taylor | 198/455 |
| 3,635,325 | 1/1972 | Sterling | 198/397 |
| 4,185,732 | 1/1980 | McMickle | 198/455 |

Primary Examiner—Joseph E. Valenza
Assistant Examiner—Brian Bond
Attorney, Agent, or Firm—Pollock, Vande Sande & Priddy

[57] ABSTRACT

The feeding device comprises a horizontal circular singling disc, which rotates continuously or intermittently and has a peripheral crown of recesses acting as article receiving pockets. The surface of the singling disc is subdivided into a first, larger article-receiving portion acting as feed reservoir for the articles which are fed at random thereinto, delimited by a fixed circumferential side wall extending over a circumferential arc around the periphery of the singling disc, and by a fixed partition wall extending across the surface of the singling disc, and into a second smaller article-delivery portion lying outside of the feed reservoir. At the interior of the feed reservoir there is mounted a distributor dish having the shape of an asymmetrical flat or truncated cone. The distributor dish is cased to perform rotary oscillations parallel to the surface of the singling disc, about an axis which coincides with the axis of rotation of the singling disc. In this manner, the articles fed into the feed reservoir are gently stirred so as to prevent clogging and to permit easy accommodation in the respective receiving pockets.

8 Claims, 2 Drawing Figures

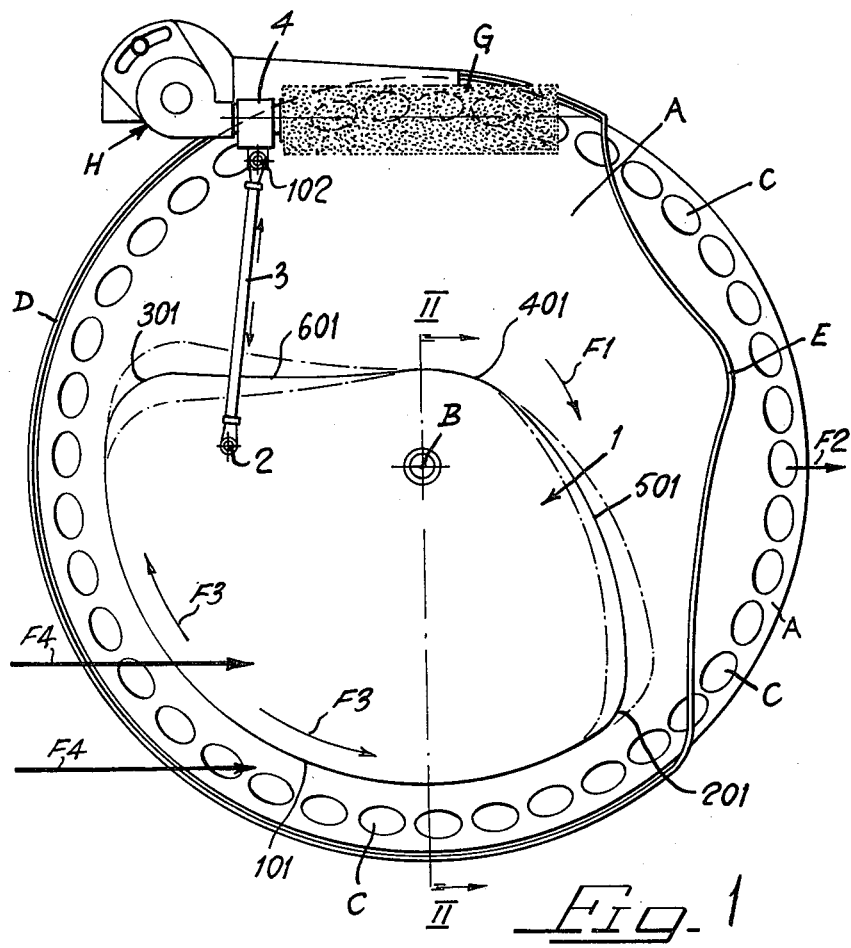
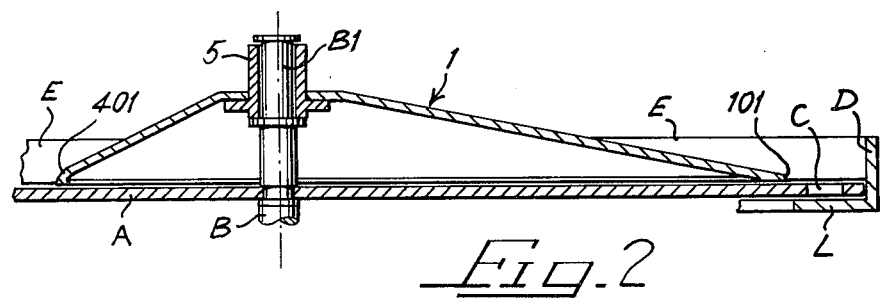

ARTICLE FEEDING DEVICE

SUMMARY OF THE INVENTION

The present invention relates to an article feeding device, and more particularly to a device for the feeding of candies to a wrapping machine. The feeding device according to the invention is of the type comprising a horizontal circular singling disc, which rotates continuously or intermittently and presents a peripheral crown of recesses acting as receiving pockets for the candies. The surface of the singling disc is subdivided into a first, larger candy-receiving portion acting as feed reservoir for the candies which are fed at random thereinto, delimited by a fixed circumferential side wall extending over a circumferential arc around the periphery of the singling disc, and by a fixed partition wall extending across the surface of the singling disc, and into a second smaller candy-delivery portion lying outside of the feed reservoir. At the interior of the feed reservoir, covering a substantial portion of the singling disc, there is mounted a distributor dish shaped like an asymmetrical flat or truncated cone.

According to the invention, the distributor dish is caused to perform rotary oscillations parallel to the surface of the singling disc, around an oscillation axis which coincides with the axis of rotation of the singling disc. In this manner, the candies fed into the feed reservoir are gently stirred so as to avoid clogging and permit easy and proper accommodations in the respective receiving pockets.

BRIEF DESCRIPTION OF THE DRAWINGS

The above and other features of the invention, and the advantages deriving therefrom, will appear evident from the following detailed description of a preferred embodiment, made with reference to the attached sheet of drawings.

FIG. 1 is a plan view of the article feeding device according to the invention.

FIG. 2 is a vertical section along line II—II of FIG. 1.

DESCRIPTION OF THE PREFERRED EMBODIMENT

In the drawings, reference letter A indicates a horizontal circular singling disc, which is secured at its center to a vertical shaft B. The shaft B is driven, through any suitable driving means (not shown), in continuous or intermittent motion in the direction of the arrow F1, and consequently it promotes the rotation of the singling disc A in the same direction. In its peripheral zone, the singling disc A presents a circular crown of through recesses C, concentrical to the driving shaft B, each one of the recesses C constituting the receiving pocket for a candy, and being closed at the bottom by a support ring L.

Around a portion of the circular singling disc A, there is arranged a fixed side wall D, in the shape of a circumferential arc, and secured for example, to the support ring L. The ends of the side wall D are connected to one another by a partition wall E, which extends across the singling disc A as a chord of shape. In this manner, the surface of the singling disc A is divided into a larger receiving portion (at the left in FIG. 1) delimited by the side wall D and by the partition wall E, and into a remaining, smaller, delivery portion (at the right in FIG. 1).

In this manner, the side wall D and the partition wall E define a flat feed reservoir, the bottom of which is constituted by the receiving portion of the singling disc A. The delivery portion of the singling disc A is located outside of the said feed reservoir.

On a supporting member H, fixed and located exteriorly of the singling disc A, there is rotatably arranged a brush roller G, of a type known per se, which projects into the interior of the receiving portion of the singling disc A, in the zone of the crown of receiving pockets C. For example, the said brush roller G extends parallel to a tangent of the singling disc A and is driven into rotation by a suitable driving motor (not shown) arranged on the supporting member H.

The singling disc A, in its receiving portion, is partially covered by a distributor dish 1, which presents in section an asymmetrical cone or truncated-cone shape. The said distributor dish 1 is arranged in a rotatable manner on the upper end B1 of the shaft B, by means of a suitable hub 5. However, the said distributor dish 1 is not entrained into rotation by the driving shaft B, but it is caused to perform rotary oscillations around the said shaft B, in the direction of the arrows F3, parallel to the surface of the singling disc A.

For this purpose, the distributor dish 1 is connected at a point 2 which is eccentric to the shaft B, by means of a reciprocating rod 3, to a driving sleeve 4, at a point 102 of said driving sleeve, which is rotatably mounted on an eccentric portion of the driving shaft of the brush roller G. Of course, the said eccentric drive can be imparted also by cam means. The rotary oscillation of the distributor dish 1 is selected in such a manner that the said distributor dish alternately oscillates, in the direction of the arrows F3, between the positions indicated by dash-and-dot lines in FIG. 1. Means can be provided for the adjustment of the amplitude of the rotary oscillations of the distributor dish 1.

The peripheral portion of the asymmetrical-cone-shaped distributor dish 1, which is remotest from the driving shaft B, has a circular arc shape, concentric to the shaft B, and extends along the inner periphery of the crown of receiving pockets C at a short distance therefrom. The diametrally opposite section 401 of the distributor dish 1 is located near to the shaft B, and is connected to the extremities of the said remotest arc shaped peripheral portion by (a) two edge portions 501, 601, which may be straight or slightly curved, and which are somewhat radially disposed with respect to the singling disc A, and (b) by suitably rounded portions 201, 301. Thus, the distributor dish 1 presents, in top plan view, approximately the shape of a sector having as arc the section 101 and as radii the edge portions 501, 601.

The edge portion 501 which is located upstream in terms of the direction of rotation (arrow F1) of the singling disc A, is preferably convex, while the other edge portion 601 is preferably concave.

The candies to be wrapped (not shown) are discharged at random, for example by means of a discharge chute (not shown), in the direction of the arrows F4, inside the feed reservoir defined by the side wall D and by the partition wall E. As a result of the continuous or intermittent rotary motion of the singling disc A and the rotary oscillations of the distributor dish 1 around the common shaft B, the candies are caused to move, and maintained in motion, until they fall into the respective receiving pockets C of the singling disc A. The brush roller G brushes off the excess candies, i.e., the candies which have been housed only partially in the receiving pockets C, and broken or anomalous candies. These excess candies are brought back into circulation by the rotation of the singling disc A. The single candies which have been properly received and housed in the receiving pockets C are substained during their movement by the support ring L, pass under the partition wall E and reach the delivery zone of the singling disc A, where they are removed in any convenient manner from the receiving pockets C, as indicated by the arrow F2, by suitable means for further processing, e.g., wrapping.

I claim:

1. A device for feeding articles in orderly succession for further processing, comprising
   (a) a horizontally disposed, circular disc having a crown of recesses spaced along its circumference for receiving said articles;
   (b) means for rotating said disc;
   (c) the surface of said disc being subdivided into
      (i) a larger receiving portion acting as a feed reservoir completely enclosed by a fixed circumferential side wall extending along the periphery of said disc, and a fixed partition wall extending across the interior of said disc; and
      (ii) a smaller delivery portion located outside of said feed reservoir;
   (d) a distributor dish of generally conical shape which covers a portion of said receiving portion and has an arcuate circumferential portion adjacent to the inner periphery of said crown of recesses, said distributor dish presenting, in top plan view, the approximate shape of a sector with rounded corners, the arc of said sector being concentric with the rotation axis of said disc and extending close to the inner periphery of said crown of recesses, and the radial edge of said sector located upstream in the direction of rotation of said disc being curved in a convex manner, while the radial edge of said sector located downstream in the direction of rotation of said disc is curved in a concave manner; and
   (e) means for driving said distributor dish in a rotary oscillating path in a plane parallel to the surface of said disc about a vertical axis;
   (f) whereby said articles fed into said feed reservoir are agitated sufficiently to prevent clogging of said reservoir and to facilitate their orderly reception in said recesses.

2. A device according to claim 1, wherein said vertical axis is common to said distributor dish and said disc.

3. A device according to claim 1, wherein said distributor dish has the shape of an asymmetrical flat cone.

4. A device according to claim 1, wherein said distributor dish has the shape of a truncated cone.

5. A device according to claim 1, which comprises a rotating brush roller mounted on a drive shaft, for assisting the movement of said articles into said recesses of said disc.

6. A device according to claim 5, wherein said means for driving said distributor dish comprise a sleeve mounted on an eccentric portion of said drive shaft of said brush roller, said sleeve being connected by means of a reciprocating rod to said distributor dish.

7. A device according to claim 1, wherein said disc rotates continuously.

8. A device according to claim 1, wherein said disc rotates intermittently.

* * * * *